United States Patent [19]
Vicars-Harris

[11] 4,290,099
[45] Sep. 15, 1981

[54] LAMPSHADE

[75] Inventor: Nigel Vicars-Harris, Gwynedd, England

[73] Assignee: B. Blumenthal & Co., Inc., Carlstadt, N.J.

[21] Appl. No.: 49,647

[22] Filed: Jun. 18, 1979

[30] Foreign Application Priority Data

Nov. 28, 1978 [GB] United Kingdom ............... 46366/78

[51] Int. Cl.³ .............................................. F21V 1/06
[52] U.S. Cl. .................................... 362/352; 362/358; 362/450; 403/195; 403/242
[58] Field of Search ............... 362/352, 358, 351, 357, 362/360, 367, 450; 403/230, 242, 192, 193, 195

[56] References Cited

U.S. PATENT DOCUMENTS

| | | | |
|---|---|---|---|
| 2,538,676 | 1/1951 | Enright | 362/352 |
| 3,787,676 | 1/1974 | Korach | 362/352 |
| 4,165,529 | 8/1979 | Hazelthorn | 362/352 |

*Primary Examiner*—Donald P. Walsh
*Attorney, Agent, or Firm*—Charles E. Baxley

[57] ABSTRACT

To minimize storage and transportation space, lampshades are produced, e.g. at the factory, as self-assembly kits each comprising a pair of rings, a plurality of connecting rods, and a gimbal consisting of a lampholder-receiving annulus with struts extending therefrom, together with a covering fabric panel and an optional lining fabric panel. The rods and struts have, on their free ends, respective tee-pieces each comprising a socket part which is a friction fit on the respective rod or strut, and a cross-piece which is slotted from end to end. The kit can be packed in a package of shape and dimensions in plan such as to contain the larger of the two rings and of a depth to contain the gimbal on its side. The eventual user assembles the lampshade with the connecting rods extending between the two rings and holding the latter spaced apart, the cross-piece of their tee-pieces being snapped onto the rings. Thereafter the covering panel (and the lining if used) is secured in place between the two rings, e.g. by sewing, clipping, or adhering.

2 Claims, 3 Drawing Figures

LAMPSHADE

BACKGROUND OF THE INVENTION

This invention concerns lampshades.

The transportation of lampshades from factories to customers, such as wholesalers and retailers, involves a significant problem in economics. Lampshades of the kind comprising a framework having a covering of fabric or other sheet material are generally very light but occupy a considerable space; as a result, the costs involved in relation to transport can represent a significant, even a major proportion of the cost price thereof.

An object of the present invention is to provide a lampshade construction which is such that the components thereof can be put together into a relatively small package as a kit from which the eventual purchaser or user can assemble his or her own lampshade without the need to use any tools or equipment in relation to constructing the framework thereof.

SUMMARY OF THE INVENTION

With this object in view, the present invention provides a lampshade comprising a framework including an upper ring, a lower ring, a plurality of connecting rods connecting with said rings and holding them in spaced-apart relationship, and a gimbal composed of a lampholder-annulus and struts extruding therefrom to one of the said rings, and a covering supported by the upper and lower rings of the framework, characterised in that said connecting rods and the struts are connected to the rings by tee-pieces on the respective ends of the rods and struts, each said tee-piece comprising a socket into which the respective end of the respective rod or strut is a friction fit, and a cross-piece which is slotted from end to end and is a snap fit on the respective ring.

With such an arrangement, therefore, the construction of the framework can be effected manually, by fitting the tee-pieces onto the ends of the connecting rods and struts and then snapping them on to the respective rings. Thereafter the covering, which may for instance be of fabric, can be fitted to the rings of the framework and secured, e.g. by stitching clipping, or by means of adhesive.

The tee-pieces are conveniently of plastics material, such as nylon or polypropylene, being made by moulding. To contribute to the rigidity of the framework, in each said tee-piece there is preferably a stiffening web in each of the angles between the socket and the cross-piece.

The invention further includes a kit of components adapted for assembly into a lampshade as above discussed, and this kit may further include an inner lining fabric.

BRIEF DESCRIPTION OF THE DRAWINGS

The invention will be described further, by way of example, with reference to the accompanying drawing, in which.

DESCRIPTION OF THE ILLUSTRATED EMBODIMENT

Figure 1:
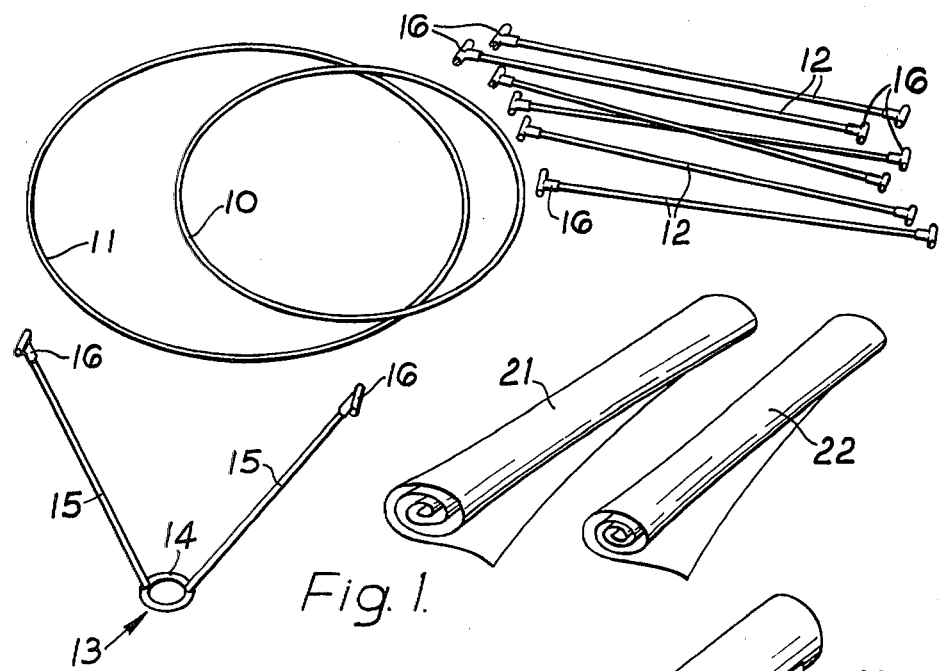
FIG. 1 is a diagrammatic illustration of the components of a preferred embodiment of the lampshade of the invention.

As shown in FIG. 1, a kit of components for use in constructing a lampshade conforming to the present invention comprises a relatively smaller diameter ring 10, a relatively larger ring 11 and a plurality of connecting rods 12, these all being made of relatively stiff metal wire. Also provided is a gimbal 13 which includes an annular disc 14 serving for fitting to an electrical lampholder (not shown) and from which extend two struts 15 which are disposed at an angle to one another and are made of the same material as the connecting rods 12.

Figure 2:
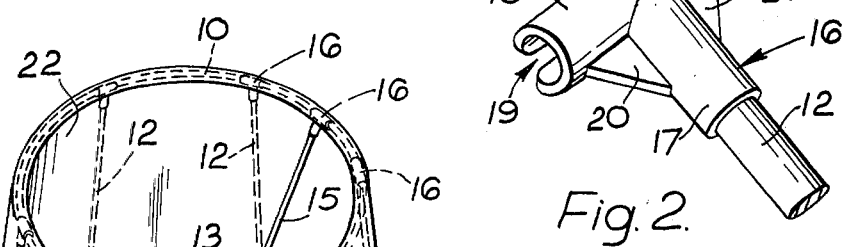
FIG. 2 is an enlarged fragmentary detail illustrating the construction of one of the tee-pieces shown in FIG. 1.

Provided on each end of each of the connecting rods 12 and on the free ends of the two struts 15 are respective tee-pieces 16 of which one is shown to an enlarged scale in FIG. 2. As shown, each said tee-piece 16 comprises a socket part 17 which joins with a respective cross-piece 18 which is formed with a slot 19 extending in the axial direction from end to end thereof. It will readily be appreciated, therefore, that the rods 12 and struts 15 can be connected, very easily, by means of the tee-pieces 16, to the rings 10 and 11, simply by snapping the cross-pieces 18 thereof onto the respective ring. The manner of doing this will be described shortly in connection with FIG. 3.

Respective integral stiffening webs 20 are provided in the angles between the socket 17 and the cross piece 18.

Also provided in the kit of parts is a decorative outer fabric panel 21, which is shown in a rolled-up condition, and optionally provided is an inner lining fabric panel 22 which is also shown rolled up.

Figure 3:
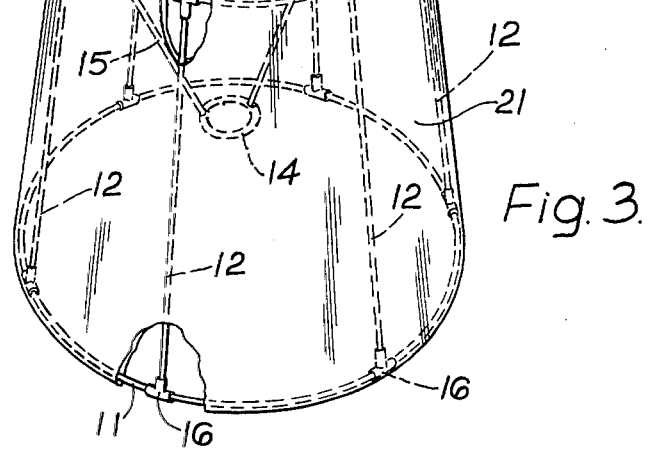
FIG. 3 is a perspective view illustrating the lampshade made using the components of FIG. 1, part of the covering and lining thereof having been cut away to show detail of the framework thereof.

FIG. 3 shows how the various parts from the kit are assembled together to form a complete lampshade. Six of the connecting rods 12 are provided in the illustrated case, and these are each connected by one end to the smaller ring 10 and by the other end to the larger ring 11, by snapping the corresponding tee-pieces 16 onto such rings 10, 11, thereafter adjustment being effected to ensure that the connecting rods 12 are approximately equally spaced apart. Of course, more than or fewer than six of the connecting rods 12 and be used, within the limits of practicality, but six such rods will normally ensure that the finished shade is adequately rigid.

The connecting rods 12 having been fitted and adjusted, the gimbal 13 is then fitted in place. In the illustrated case, this is snapped onto the smaller-diameter ring 10 which is at the upper end of the finished lampshade, but of course the arrangement could equally be such that the gimbal is fitted to the lower larger-diameter ring 11.

This completes the assembly of the framework of the lampshade, and thereupon the decorative fabric panel 21 is arranged between the upper and lower rings 10 and 11 as is shown in FIG. 3 and is sewn in place by turning it over the two rings 10, 11 as a folded hem and sewing such hem down, any appropriate adjusting of the size and/or shape of the panel being effected as necessary, and trimmings (not shown) being applied if desired. If a lining is required, the lining fabric panel 22 is then brought into place and sewed in. Naturally, means other than sewing can be employed for applying the fabric panel or panels. For instance use may be made of double-sided adhesive strips which are applied so that the hem of the main decorative fabric panel 21, when turned down, simply sticks in place, and the lining panel 22 can similarly be adhered in place.

It will readily be understood that the primary advantage of the lampshade construction of the invention lies in the fact that each lampshade, in its unassembled condition, when it leaves the factory, can be accommodated in a shallow package whose size in plan needs only to be large enough to accommodate the larger-diameter ring 11 and whose depth need only be sufficient to accept the diameter of the annulus 14 of the gimbal 13, since the latter can, of course, be inserted into the package, on its side. Accordingly, the overall space occupied by wholesale members of the lampshades is small in comparison with fully-assembled shades. A further advantage lies in the fact that the eventual user can determine the overall height of the finished product by trimming the lengths of the connecting rods 12 as may be desired.

Naturally, the invention is not confined to the precise details of the foregoing example and variations may be made thereto with the scope of the following claims.

We claim:

1. A lampshade having a framework including an upper ring, a lower ring, a plurality of connecting rods connecting said rings and holding them in spacedapart relationship, a gimbal composed of a lampholder-annulus and struts extending therefrom to one of said rings, and a covering supported by the upper and lower rings of the framework, wherein the invention comprises tee-pieces on the ends of the rods for connecting the rods to the rings, each said tee-piece having a tubular socket part into which the respective end of the respective rod is friction fit, a resilient, stabilizing cross-piece on an end of the socket part, said cross-piece having a length that is at least equal to the length of said socket part, said cross-piece being slotted from end to end in order to establish a narrow gap that provides a snap fit on the respective ring and to conform to the arcuate ring curvature, and a respective stiffening web in each of the angles between the socket and the cross-piece, each of said webs extending from the approximate socket part mid-point to the approximate mid-point of the adjacent portion of the cross-piece.

2. A lampshade having a framework including an upper ring and lower ring and plurality of connecting rods connecting the rings and holding them in spaced-apart relationship, a gimbal composed of a lampholder-annulus and struts extending therefrom to one of the rings, a covering supported by the upper and lower rings of the framework, wherein the invention comprises tee-pieces that join respective connecting rods to at least one of the rings, each tee-piece comprising a tubular socket into which a respective end of a respective rod is friction fit, a resilient, stabilizing cross-piece having a length that is at least equal to the length of the socket part, said cross-piece being sotted from end to end in order to establish a narrow gap that provides snap fit on the ring and to conform to the arcuate curve thereof on an end of the socket part, each tee-piece having a respective stiffening web in each of the angles between the socket and the cross-piece each of said webs extending from the approximate socket part mid-point to the approximate mid-point of the adjacent portion of the cross-piece.

* * * * *